(12) United States Patent
Jiang et al.

(10) Patent No.: US 11,003,754 B2
(45) Date of Patent: *May 11, 2021

(54) METHOD AND APPARATUS FOR USER AUTHENTICATION BASED ON FEATURE INFORMATION

(71) Applicant: Advanced New Technologies Co., Ltd., Grand Cayman (KY)

(72) Inventors: Nan Jiang, Zhejiang (CN); Mingyu Guo, Zhejiang (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/776,047

(22) Filed: Jan. 29, 2020

(65) Prior Publication Data

US 2020/0167458 A1 May 28, 2020

Related U.S. Application Data

(63) Continuation of application No. 16/599,599, filed on Oct. 11, 2019, which is a continuation of application No. PCT/CN2018/097276, filed on Jul. 26, 2018.

(30) Foreign Application Priority Data

Jul. 27, 2017 (CN) .......................... 201710622716.9

(51) Int. Cl.
  *G06F 21/32* (2013.01)
  *G06K 9/00* (2006.01)
  *G06K 9/62* (2006.01)

(52) U.S. Cl.
  CPC .......... *G06F 21/32* (2013.01); *G06K 9/00248* (2013.01); *G06K 9/6215* (2013.01); *G06K 9/6231* (2013.01); *G06K 9/6265* (2013.01)

(58) Field of Classification Search
  CPC .. G06F 21/32; G06K 9/00248; G06K 9/6215; G06K 9/6231; G06K 9/00288;
  (Continued)

(56) References Cited

U.S. PATENT DOCUMENTS

2003/0039380 A1* 2/2003 Sukegawa .......... G06K 9/00288
  382/118
2014/0254892 A1 9/2014 Park et al.
  (Continued)

FOREIGN PATENT DOCUMENTS

CN 104598795 A 5/2015
CN 104615658 A 5/2015
  (Continued)

OTHER PUBLICATIONS

Extended Search Report for European Patent Application No. 18838562.9, dated Mar. 27, 2020.
  (Continued)

*Primary Examiner* — Paul E Callahan
(74) *Attorney, Agent, or Firm* — Finnegan, Henderson, Farabow, Garrett & Dunner, LLP

(57) ABSTRACT

A method for user authentication based on feature information includes: judging whether a user to be authenticated belongs to a similar user group, wherein the similar user group comprises at least two similar users, and the similar users are users whose reference feature information meets a preset similarity condition and a preset distinguishability condition; and authenticating the user to be authenticated according to reference feature information in the similar user group if the user to be authenticated belongs to the similar user group.

17 Claims, 9 Drawing Sheets

(58) Field of Classification Search
CPC ........... G06K 9/00221; G06K 9/00268; G06K 9/00295; H04L 63/0861; H04N 21/4415
See application file for complete search history.

(56) References Cited

U.S. PATENT DOCUMENTS

2014/0294254 A1* 10/2014 Kim .................. G06F 21/32
382/118
2017/0124385 A1* 5/2017 Ganong ............. G06Q 30/0241

FOREIGN PATENT DOCUMENTS

| | | |
|---|---|---|
| CN | 106778684 A | 5/2017 |
| CN | 106897590 A | 6/2017 |
| EP | 1 291 807 A2 | 3/2003 |
| EP | 2 787 463 A1 | 10/2014 |

OTHER PUBLICATIONS

International Search Report in International Application No. PCT/CN2018/097276, dated Oct. 24, 2018.
Written Opinion for Application No. 11201907795X, issued by the Intellectual Property Office of Singapore, dated Jun. 4, 2020.
Notice of Preliminary Rejection for Korean Application No. 10-2019-7026682, dated Jan. 23, 2021.

* cited by examiner

METHOD AND APPARATUS FOR USER AUTHENTICATION BASED ON FEATURE INFORMATION

CROSS-REFERENCE TO RELATED APPLICATIONS

This application is a continuation application of U.S. application Ser. No. 16/599,599, filed on Oct. 11, 2019, which is a continuation application of International Application No. PCT/CN2018/097276, filed on Jul. 26, 2018, which is based upon and claims priority to Chinese Patent Application No. 201710622716.9, filed on Jul. 27, 2017, the entire content of all of which is incorporated herein by reference.

TECHNICAL FIELD

This specification relates to the field of identification technologies, and in particular, to a method and an apparatus for user authentication based on feature information.

BACKGROUND

Face recognition, as a recognition technology with good user experience, is increasingly widely applied in many scenarios. The principle of the face recognition is collecting a face image of a target user, extracting an image feature, comparing the image feature with a picture or image feature pre-stored by the target user in a system, and deciding the identity authenticity of the user according to a comparison result.

However, the existing face recognition technology may not achieve a 100% accuracy rate. For example, a misrecognition may occur in such a special case as similar faces (e.g., identical twins, father and son, mother and daughter, "celebrity faces," and the like), and the misrecognition usually brings trouble to life or work of a user, or even causes an account and funds of the user to be stolen. Therefore, recognition of similar faces is a difficult problem in face recognition.

To prevent the aforementioned misrecognition, risky users who possibly have similar faces are all shielded in the existing art, that is, risky users are not allowed to use face recognition. However, with the wide application of the face recognition technology, the user base of the face recognition technology also grows dramatically, which also causes a rapid increase in the number of users with similar looks. As a result, it is difficult to perform the shielding-based misrecognition prevention method in practical applications. In addition, the shielding method may not solve the misrecognition problem of similar faces fundamentally.

SUMMARY

An objective of one or more embodiments of this specification is to provide a method and an apparatus for user authentication based on feature information, to improve an accuracy rate and a coverage rate of user authentication.

To solve the foregoing technical problem, embodiments of this specification are provided as follows.

In one aspect, a method for user authentication based on feature information, includes: judging whether a user to be authenticated belongs to a similar user group, wherein the similar user group includes at least two similar users, and the similar users are users whose reference feature information meets a preset similarity condition and a preset distinguishability condition; and authenticating the user to be authenticated according to reference feature information in the similar user group if the user to be authenticated belongs to the similar user group.

In another aspect, a method for user authentication based on feature information, includes: receiving an authentication request of a user to be authenticated, the authentication request including identifier information of the user to be authenticated; judging whether the user to be authenticated belongs to a similar user group according to the identifier information of the user to be authenticated, wherein the similar user group includes at least two similar users, and the similar users are users whose reference feature information meets a preset similarity condition and a preset distinguishability condition; when the user to be authenticated belongs to the similar user group, acquiring feature information collected for the user to be authenticated, calculating a first similarity degree between the collected feature information and reference feature information corresponding to a first similar user in the similar user group, and calculating a second similarity degree between the collected feature information and reference feature information corresponding to a second similar user in the similar user group, wherein the first similar user is a similar user having the same identifier information as that of the user to be authenticated, and the second similar user is a similar user whose identifier information is different from that of the user to be authenticated; and determining that the user to be authenticated passes the authentication if the first similarity degree is greater than the second similarity degree.

In further another aspect, an apparatus for user authentication based on feature information, includes: a processor; and a memory configured to store computer executable instructions, wherein when executing the computer executable instructions, the processor performs: judging whether a user to be authenticated belongs to a similar user group, wherein the similar user group includes at least two similar users, and the similar users are users whose reference feature information meets a preset similarity condition and a preset distinguishability condition; and authenticating the user to be authenticated according to reference feature information in the similar user group if the user to be authenticated belongs to the similar user group.

In further another aspect, an apparatus for user authentication based on feature information, includes: a processor; and a memory configured to store computer executable instructions, wherein when executing the computer executable instructions, the processor performs: receiving an authentication request of a user to be authenticated, the authentication request including identifier information of the user to be authenticated; judging whether the user to be authenticated belongs to a similar user group according to the identifier information of the user to be authenticated, wherein the similar user group includes at least two similar users, and the similar users are users whose reference feature information meets a preset similarity condition and a preset distinguishability condition; when the user to be authenticated belongs to the similar user group, acquiring feature information collected for the user to be authenticated, calculating a first similarity degree between the collected feature information and reference feature information corresponding to a first similar user in the similar user group, and calculating a second similarity degree between the collected feature information and reference feature information corresponding to a second similar user in the similar user group, wherein the first similar user is a similar user having the same identifier information as that of the user to be authenticated, and the second similar user is a similar user whose identifier information is different from that of the user to be authenticated; and determining that the user to be authenticated passes the authentication if the first similarity degree is greater than the second similarity degree.

In further another aspect, a storage medium storing computer executable instructions that, when executed by a processor of a device, cause the device to perform: judging whether a user to be authenticated belongs to a similar user group, wherein the similar user group includes at least two similar users, and the similar users are users whose reference feature information meets a preset similarity condition and a preset distinguishability condition; and authenticating the user to be authenticated according to reference feature information in the similar user group if the user to be authenticated belongs to the similar user group.

In further another aspect, a storage medium storing computer table instructions that, when executed by a processor of a device, cause the device to perform: receiving an authentication request of a user to be authenticated, the authentication request including identifier information of the user to be authenticated; judging whether the user to be authenticated belongs to a similar user group according to the identifier information of the user to be authenticated, wherein the similar user group includes at least two similar users, and the similar users are users whose reference feature information meets a preset similarity condition and a preset distinguishability condition; when the user to be authenticated belongs to the similar user group, acquiring feature information collected for the user to be authenticated, calculating a first similarity degree between the collected feature information and reference feature information corresponding to a first similar user in the similar user group, and calculating a second similarity degree between the collected feature information and reference feature information corresponding to a second similar user in the similar user group, wherein the first similar user is a similar user having the same identifier information as that of the user to be authenticated, and the second similar user is a similar user whose identifier information is different from that of the user to be authenticated; and determining that the user to be authenticated passes the authentication if the first similarity degree is greater than the second similarity degree.

By using the technical solution of one or more embodiments of this specification, it is first judged whether a user to be authenticated belongs to a similar user group, and if the user to be authenticated belongs to the similar user group, the user to be authenticated is authenticated according to reference feature information in the similar user group, wherein the similar user group includes at least two similar users, and the at least two similar users are users whose reference feature information meets a preset similarity condition and a preset distinguishability condition. The technical solution can implement authentication for the user to be authenticated by using the similar user group to which similar users meeting the preset similarity condition and the preset distinguishability condition belong. Therefore, the user to be authenticated can be distinguished from a similar user thereof, thus preventing misrecognition between multiple similar users (for example, faces of father and son, identical twins, and so on), and further improving an accuracy rate of the user authentication. In addition, compared with the prior art in which authentication for similar users is shielded, this technical solution greatly improves a coverage rate of the user authentication.

BRIEF DESCRIPTION OF THE DRAWINGS

The accompanying drawings are incorporated into the description and constitute a part of the present description, and together with the description, illustrate embodiments and explain the principle disclosed in the specification.

DETAILED DESCRIPTION

Embodiments of this specification provide a method and an apparatus for user authentication based on feature information, to improve an accuracy rate and a coverage rate of user authentication.

Technical solutions in the embodiments of this specification are described below with reference to the accompanying drawings. The described embodiments are merely examples, rather than all of the embodiments consistent with this specification. Based on one or more embodiments of this specification, all other embodiments obtained by those of ordinary skill in the art without creative efforts should belong to the protection scope of the specification.

Figure 1:
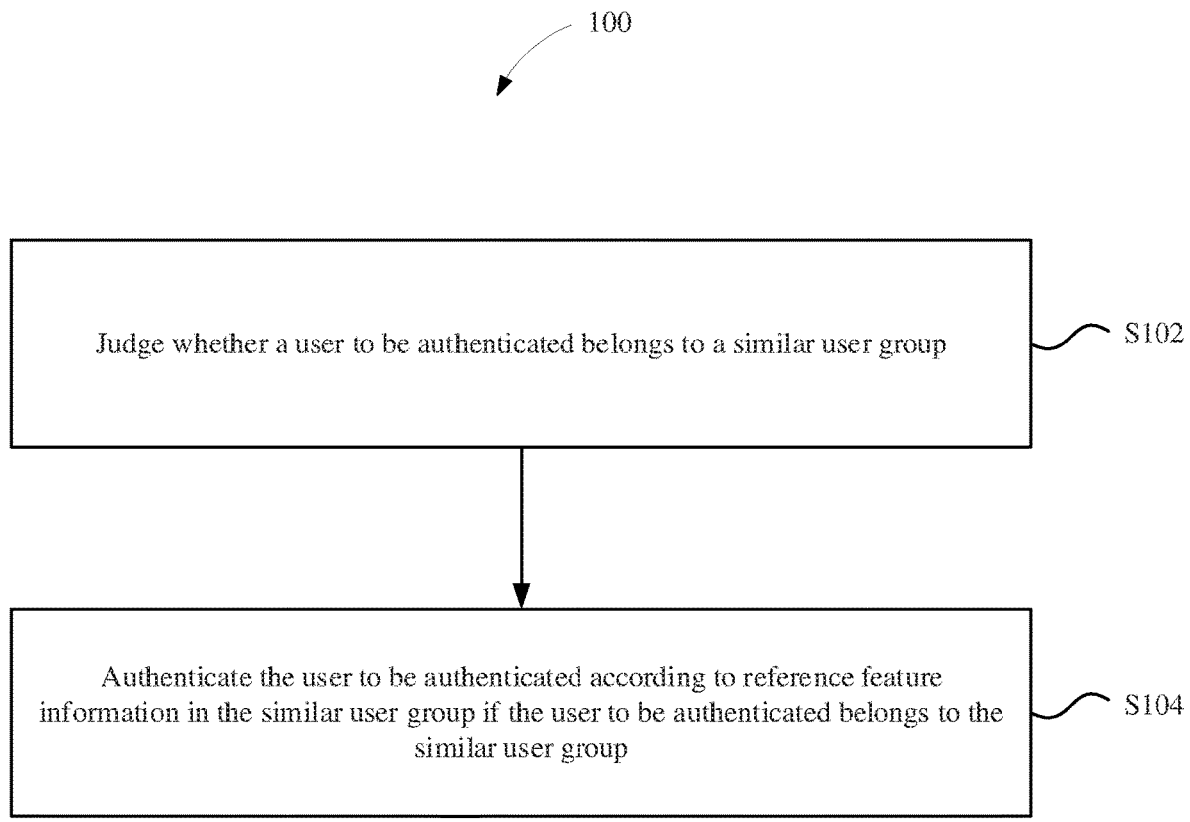
FIG. 1 is a flowchart of a method for user authentication based on feature information according to an embodiment.

FIG. 1 is a flowchart of a method 100 for user authentication based on feature information according to an embodiment. As shown in FIG. 1, the method 100 includes the following steps.

In step S102, it is judged whether a user to be authenticated belongs to a similar user group.

The similar user group includes at least two similar users, and the similar users are users whose reference feature information meets a preset similarity condition and a preset distinguishability condition. When similar users are stored in the similar user group, identifier information of each similar user is stored corresponding to the similar user. As such, during the specific implementation, identifier information of the user to be authenticated can be compared with the identifier information of each similar user in the similar user group. If there is a similar user notching the identifier information of the user to be authenticated, the user to be authenticated belongs to the similar user group where the similar user is located; and if there is no similar user matching the identifier information of the user to be authenticated, the user to be authenticated does not belong to the similar user group.

In step S104, the user to be authenticated is authenticated according to reference feature information in the similar user group if the user to be authenticated belongs to the similar user group.

In this embodiment, whether the user to be authenticated belongs to the similar user group may be judged according to the identifier information or feature information of the user to be authenticated.

When the judgment is made according to the identifier information of the user to be authenticated, step S102 may include the following steps: first, acquiring the identifier information of the user to be authenticated; then judging whether the identifier information of the user to be authenticated matches identifier information of a similar user in a pre-stored similar user group; if yes, determining that the user to be authenticated belongs to the similar user group; otherwise, determining that the user to be authenticated does not belong to the similar user group. In the pre-stored similar user group, each similar user is associated with corresponding identifier information. Therefore, whether the user to be authenticated belongs to the similar user group can be judged through comparison of the identifier information. The identifier information includes at least one of an ID number, a communication number, a name, and predetermined identifier information. The predetermined identifier information may be information pre-stored on a server side by the user to be authenticated and used for identifying the identity of the user, e.g., a specified numeric string, or a specified text.

When the judgment is made according to the feature information of the user to be authenticated, each similar user in the pre-stored similar user group is associated with corresponding reference feature information, and the judgment can be made by comparing the feature information of the user to be authenticated with the reference feature information of the similar users in the pre-stored similar user group. Therefore, step S1.02 may include the following steps: first, acquiring the feature information of the user to be authenticated; then judging whether the feature information of the user to be authenticated matches reference feature information of a similar user in the pre-stored similar user group; if yes, determining that the user to be authenticated belongs to the similar user group; otherwise, determining that the user to be authenticated does not belong to the similar user group.

The authentication includes security authentication. The reference feature information in the similar user group refers to feature information with a unique identification function which is pre-stored on the server side by each similar user in the similar user group, wherein the feature information may include at least one piece of the following information: a face feature, an iris feature, a fingerprint, and an eyeprint.

In this embodiment, the reference feature information includes feature information with a unique identification function which is pre-stored on the server side by users, and is mainly used to be compared with other feature information in the authentication process. The selection of the reference feature information is not limited in this embodiment. The reference feature information may be standard feature information that can meet established criteria, non-standard feature information, preferred feature information selected from multiple pieces of feature information according to a given condition, or the like.

By using the method 100, it is first judged whether a user to be authenticated belongs to a similar user group, and if the user to be authenticated belongs to the similar user group, the user to be authenticated is authenticated according to reference feature information in the similar user group, wherein the similar user group includes at least two similar users, and the at least two similar users are users whose reference feature information meets a preset similarity condition and a preset distinguishability condition. The method 100 can implement authentication for the user to be authenticated by using the similar user group to which similar users meeting the preset similarity condition and the preset distinguishability condition belong. Therefore, the user to be authenticated can be distinguished from a similar user thereof, thus preventing misrecognition between multiple similar users (for example, faces of father and son, identical twins, and so on), thereby improving an accuracy rate of the user authentication. In addition, compared with the existing art in which authentication for similar users is shielded, the method 100 may greatly improve a coverage rate of the user authentication.

Figure 2:
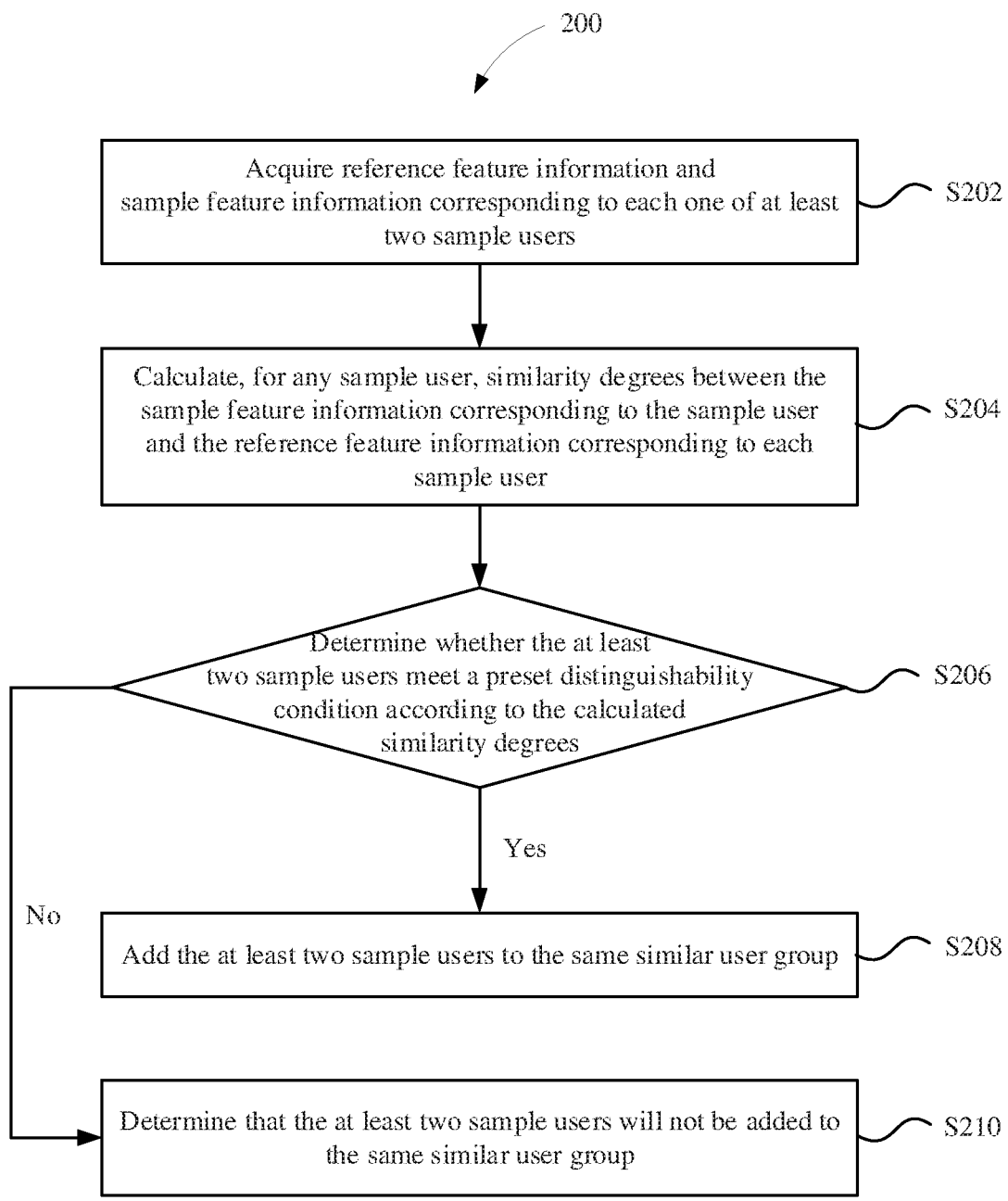
FIG. 2 is a flowchart of a method for creating a similar user group according to an embodiment.

In some embodiments, a similar user group is created in advance before the foregoing steps S102 to S104 are performed. FIG. 2 is a flowchart of a method 200 for creating a similar user group according to an embodiment. As shown in FIG. 2, the method 200 for creating a similar user group may include the following steps S202 to S210.

In step S202, reference feature information and sample feature information corresponding to each one of at least two sample users are acquired.

During selection of sample users, obviously dissimilar users can be avoided, and users with a higher similarity degree should be selected as sample users as much as possible, so as to improve the efficiency of creating the similar user group. For example, father and son, sisters, twins, or the like with similar looks are selected as sample users. Preferably, the reference feature information of the at least two sample users meets a preset similarity condition, and the preset similarity condition includes that a similarity degree of the reference feature information reaches a preset threshold.

Reference feature information corresponding to a sample user refers to feature information with a unique identification function which is pre-stored on a server side by the user. Sample feature information corresponding to a sample user may include one or more pieces of feature information of the sample user which passes historical authentication. The feature information may include at least one piece of the following information: a face feature, an iris feature, a fingerprint, and an eyeprint.

In step S204, for any sample user, similarity degrees between the sample feature information corresponding to the sample user and the reference feature information corresponding to each sample user are calculated.

In this step, when comparing the similarity degree of the feature information, a feature vector of each piece of feature information may be determined, and then a feature vector distance between different feature information is calculated to determine a similarity degree between the different feature information. If the feature information is face images, a similarity degree between different face images can also be determined by determining an eigenface (that is, a set of feature vectors for the face recognition problem in the computer vision field) corresponding to each face image, etc. In some embodiments, similarity degree comparison methods for feature information in the existing art may be used in this step.

In step S206, it is determined whether the at least two sample users meet a preset distinguishability condition according to the calculated similarity degrees; if yes, step S208 is performed; otherwise, step S210 is performed.

The preset distinguishability condition may include: based on comparisons of similarity degrees between the sample feature information of any sample user and the reference feature information corresponding to each sample user, a ratio of the number of successful similarity degree comparisons is greater than a preset ratio value. Based on the preset distinguishability condition, whether the at least two sample users meet the preset distinguishability condition may be determined through the following implementation during execution of step S206.

First, a third similarity degree between the sample feature information corresponding to any one of the at least two sample users and the reference feature information corresponding to the sample user is compared with a fourth similarity degree between the sample feature information corresponding to the sample user and the reference feature information corresponding to the other sample users of the at least two sample users, to obtain a comparison result. Then, it is judged whether the third similarity degree is greater than the fourth similarity degree according to the comparison result; if yes, it is determined that a comparison of similarity degrees between the sample feature information corresponding to the sample user and the reference feature information corresponding to each sample user is successful; otherwise, it is determined that the comparison of similarity degrees between the sample feature: information corresponding to the sample user and the reference feature information corresponding to each sample user is failed. Finally, statistics is collected on a ratio of the number of successful similarity degree comparisons, and it is determined that the at least two sample users meet the preset distinguishability condition when the ratio of the number is greater than the preset ratio value.

In addition to the ratio of the number of successful similarity degree comparisons as in this embodiment, statistics may also be made on the number of successful similarity degree comparisons, and when the number of successful similarity degree comparisons reaches a preset number, it can be determined that the at least two sample users meet the preset distinguishability condition. Alternatively and/or additionally, statistics may also be made on the number of failed similarity degree comparisons, and when the number of failed similarity degree comparisons reaches another preset number, it can be determined that the at least two sample users do not meet the preset distinguishability condition.

It should be noted that, in the foregoing implementation, "third" and "fourth" in the third similarity degree and the fourth similarity degree are merely used for distinguishing similarity degrees between different feature information, and do not limit the implementation.

In step S208, the at least two sample users are added to the same similar user group.

In step S210, it is determined that the at least two sample users will not be added to the same similar user group.

How to create a similar user group according to the method is further described below. In the following two embodiments, it can be determined that the at least two sample users meet the preset distinguishability condition only when the ratio of the number of successful similarity degree comparisons is 100% (that is, similarity degree comparisons between all pieces of the sample feature information and the reference feature information corresponding to each sample user are all successful).

In a first embodiment, the feature information is a face feature; thus, the reference feature information is a reference face feature, and the sample feature information is a sample face feature.

First, step S202 is performed by selecting, e.g., two sample users A and B. Each sample user corresponds to one reference face feature and one sample face feature. It is assumed that the sample user A corresponds to a reference face feature A1 and a sample face feature A2, and the sample user B corresponds to a reference face feature B1 and a sample face feature B2.

Then, step S204 is performed. For the sample user A, similarity degrees between the sample face feature A2 and the reference face feature A1 and between the sample face feature A2 and the reference face feature B1 are calculated respectively; for the sample user B, similarity degrees between the sample face feature B2 and the reference face feature A1 and between the sample face feature B2 and the reference face feature B1 are calculated respectively.

Next, step S206 is performed. For the sample user A, it is determined whether the similarity degree between the sample face feature A2 and the reference face feature A1 is greater than the similarity degree between the sample face feature A2 and the reference face feature B1, and if yes, it is determined that the comparison of similarity degrees between the sample face feature A2 and each reference face feature is successful; and for the sample user B, it is determined whether the similarity degree between the sample face feature B2 and the reference face feature B1 is greater than the similarity degree between the sample face feature B2 and the reference face feature A1, and if yes, it is determined that the comparison of similarity degrees between the sample face feature B2 and each reference face feature is successful.

Figure 3:
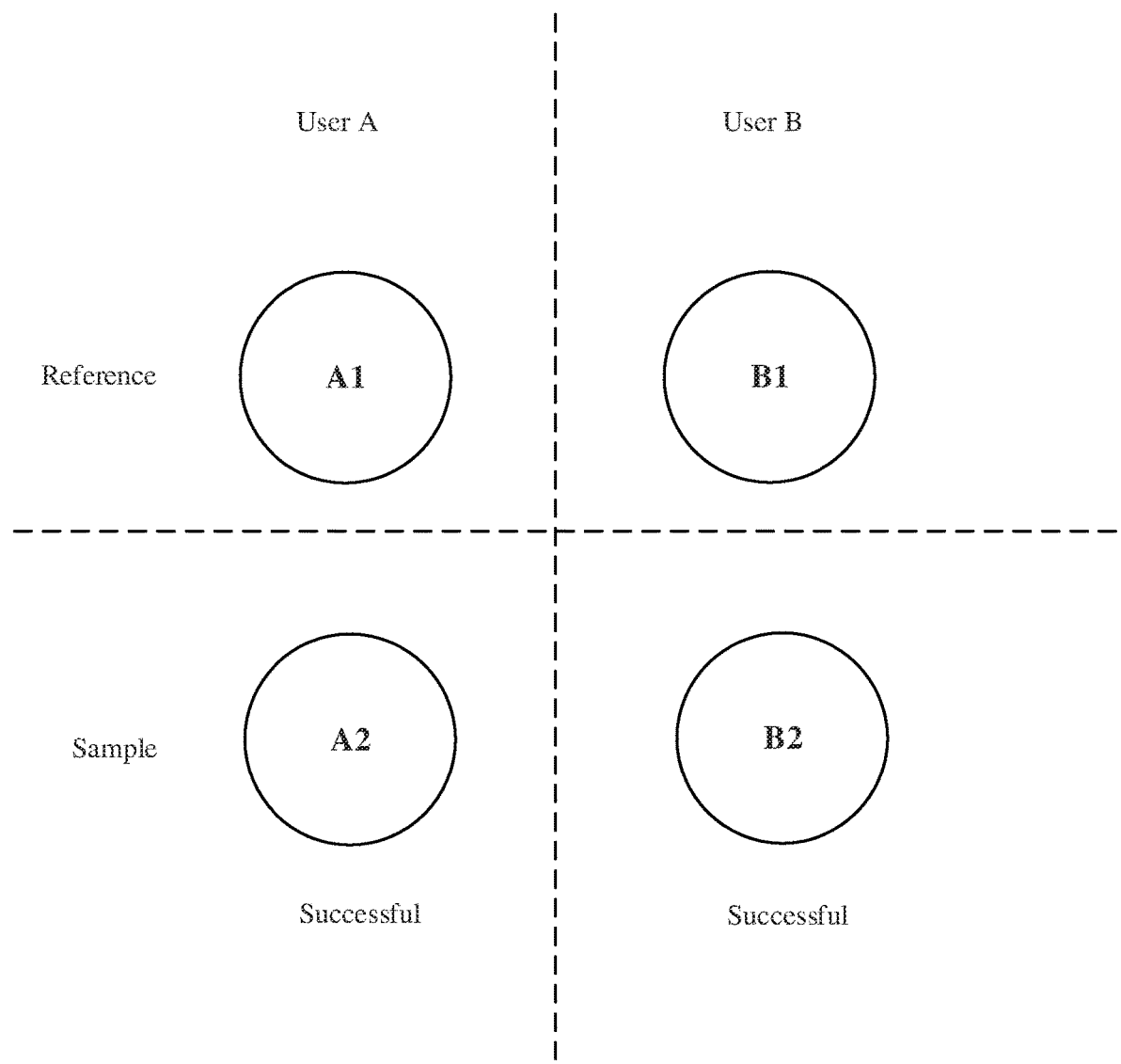
FIG. 3 is a schematic diagram of a manner of creating a similar user group according to an embodiment.

FIG. 3 is a schematic diagram of a manner of creating a similar user group according to the first embodiment. As shown in FIG. 3, "successful" displayed under the sample face feature A2 represents that the comparison of similarity degrees between the sample face feature A2 and each reference face feature is successful, and "successful" displayed under the sample face feature B2 represents that the comparison of similarity degrees between the sample face feature B2 and each reference face feature is successful. The sample user A and the sample user B can be added to the same, similar user group only when the comparison of similarity degrees between the sample face feature A2 corresponding to the sample user A and each reference face feature is successful and the comparison of similarity degrees between the sample face feature B2 corresponding to the sample user B and each reference face feature is successful; otherwise, the sample user A and the sample user B may not be added to the similar user group if any similarity degree comparison is failed.

In a second embodiment, the feature information is a face feature; thus, the reference feature information is a reference face feature, and the sample feature information is a sample face feature.

First, step S202 is performed by selecting, e.g., two sample users A and B. Each sample user corresponds to one reference face feature and three sample face features. It is assumed that the sample user A corresponds to a reference face feature A1 as well as a sample face feature A2, a sample face feature A3, and a sample face feature A4; the sample user B corresponds to a reference face feature B1 as well as a sample face feature B2, a sample face feature B3, and a sample face feature B4.

Then, step S204 is performed. For the sample user A, similarity degrees between the sample face feature A2 and the reference face feature A1 and between the sample face feature A2 and the reference face feature B1 are calculated respectively; similarity degrees between the sample face feature A3 and the reference face feature A1 and between the sample face feature A3 and the reference face feature B1 are calculated respectively; and similarity degrees between the sample face feature A4 and the reference face feature A1 and between the sample face feature A4 and the reference face feature B1 are calculated respectively.

For the sample user B, similarity degrees between the sample face feature B2 and the reference face feature A1 and between the sample face feature B2 and the reference face feature B1 are calculated respectively; similarity degrees between the sample face feature B3 and the reference face feature A1 and between the sample face feature B3 and the reference face feature B1 are calculated respectively; and similarity degrees between the sample face feature B4 and the reference face feature A1 and between the sample face feature B4 and the reference face feature B1 are calculated respectively.

Next, step S206 is performed. For the sample user A, it is determined whether the similarity degree between the sample face feature A2 and the reference face feature A1 is greater than the similarity degree between the sample face feature A2 and the reference face feature B1; if yes, it is determined that the comparison of similarity degrees between the sample face feature A2 and each reference face feature is successful; otherwise, it is determined that the comparison of similarity degrees between the sample face feature A2 and each reference face feature is failed. In addition, it is determined whether the similarity degree between the sample face feature A3 and the reference face feature A1 is greater than the similarity degree between the sample face feature A3 and the reference face feature B1; if yes, it is determined that the comparison of similarity degrees between the sample face feature A3 and each reference face feature is successful; otherwise, it is determined that the comparison of similarity degrees between the sample face feature A3 and each reference face feature is failed. Moreover, it is determined whether the similarity degree between the sample face feature A4 and the reference face feature A1 is greater than the similarity degree between the sample face feature A4 and the reference face feature B1; if yes, it is determined that the comparison of similarity degrees between the sample face feature A4 and each reference face feature is successful; otherwise, it is determined that the comparison of similarity degrees between the sample face feature A4 and each reference face feature is failed.

For the sample user B, it is determined whether the similarity degree between the sample face feature B2 and the reference face feature B1 is greater than the similarity degree between the sample face feature B2 and the reference face feature A1; if yes, it is determined that the comparison of similarity degrees between the sample face feature B2 and each reference face feature is successful; otherwise, it is determined that the comparison of similarity degrees between the sample face feature B2 and each reference face feature is failed. In addition, it is determined whether the similarity degree between the sample face feature B3 and the reference face feature B1 is greater than the similarity degree between the sample face feature B3 and the reference face feature A1; if yes, it is determined that the comparison of similarity degrees between the sample face feature B3 and each reference face feature is successful; otherwise, it is determined that the comparison of similarity degrees between the sample face feature B3 and each reference face feature is failed. Moreover, it is determined whether the similarity degree between the sample face feature B4 and the reference face feature B1 is greater than the similarity degree between the sample face feature B4 and the reference face feature A1; if yes, it is determined that the comparison of similarity degrees between the sample face feature B4 and each reference face feature is successful; otherwise, it is determined that the comparison of similarity degrees between the sample face feature B4 and each reference face feature is failed.

Figure 4:
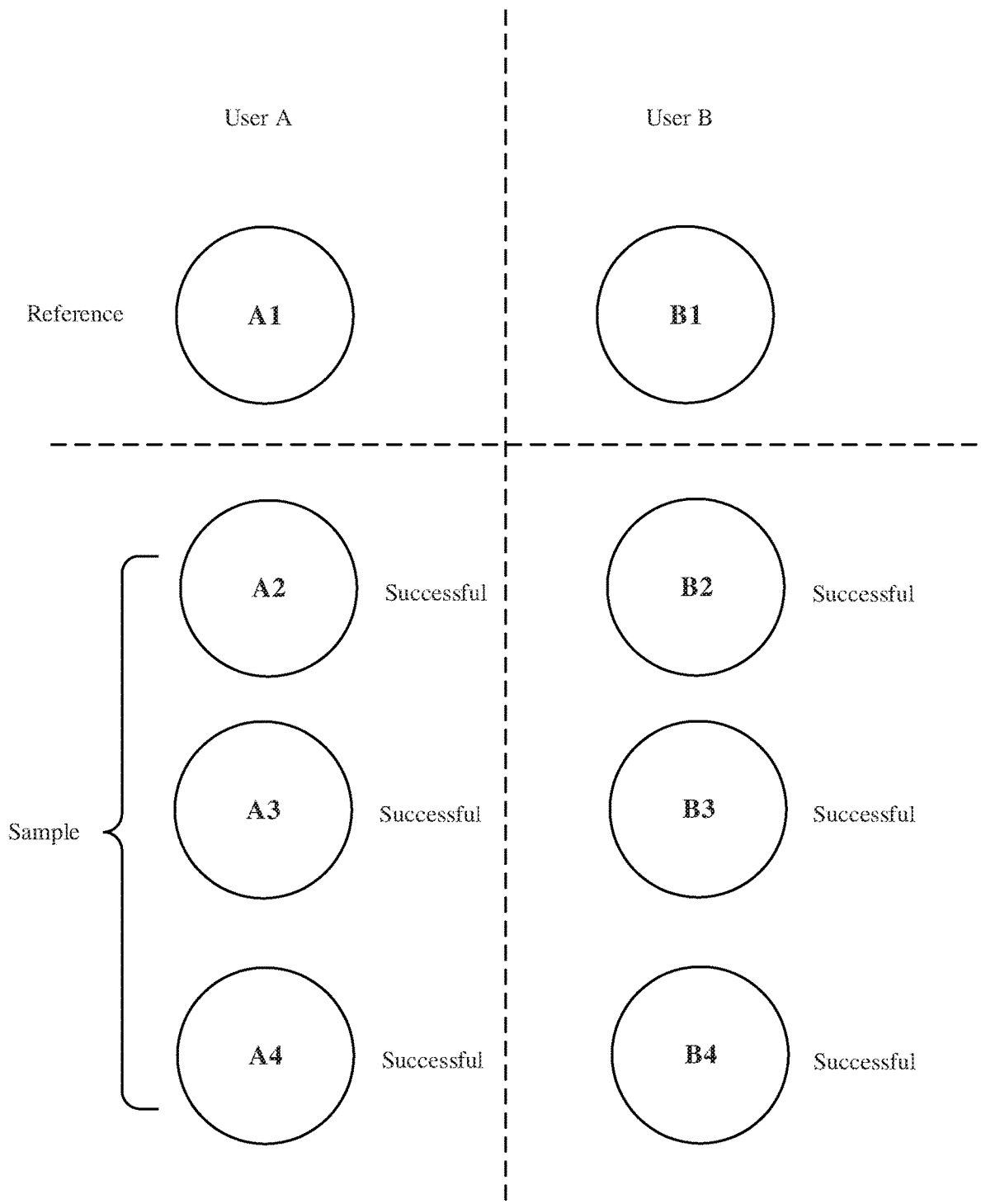
FIG. 4 is a schematic diagram of a manner of creating a similar user group according to an embodiment.
Figure 5:
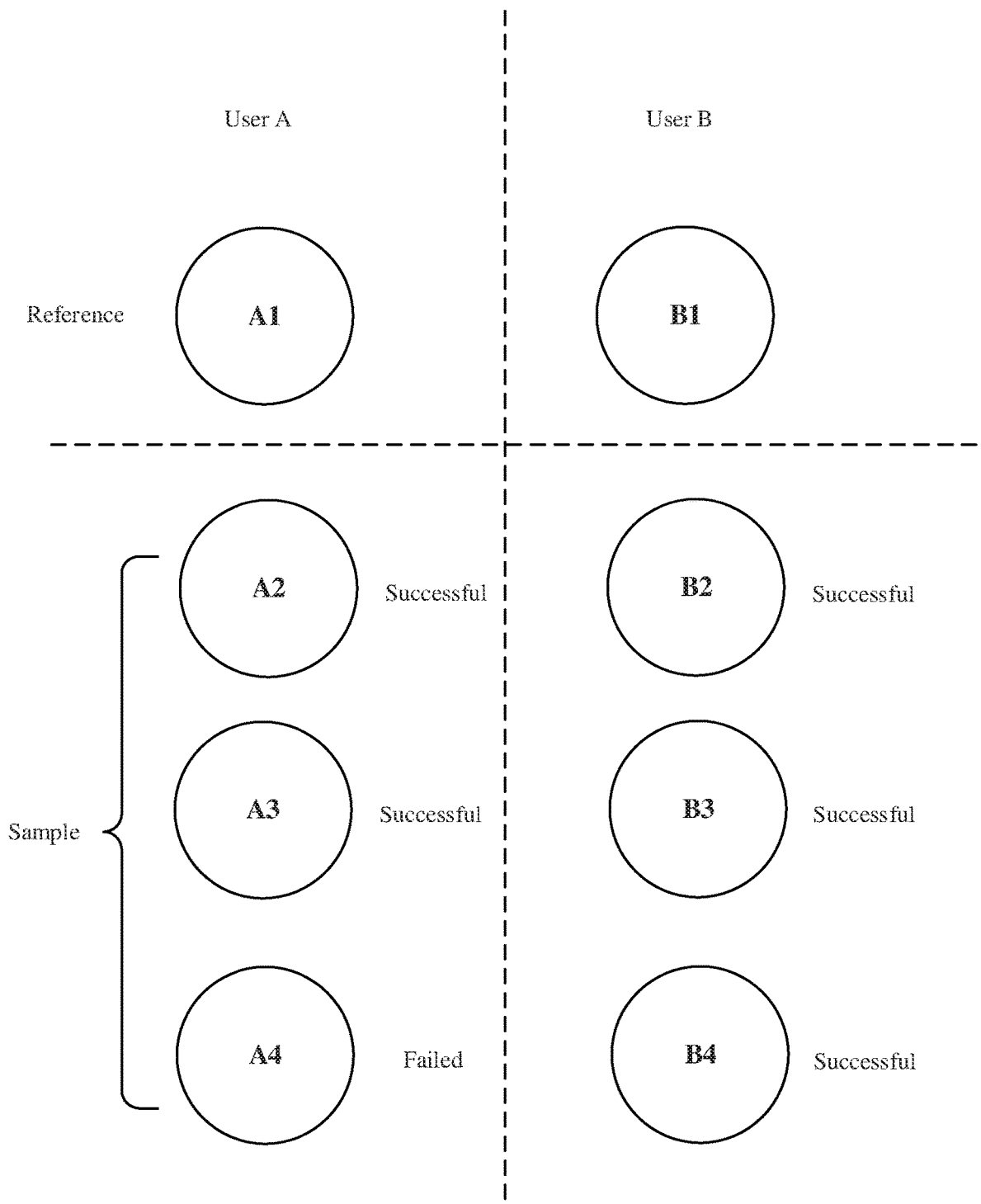
FIG. 5 is a schematic diagram of another manner of creating a similar user group according to an embodiment.

FIG. 4 and FIG. 5 are schematic diagrams of manners of creating a similar user group according to the second embodiment. As shown in FIG. 4 and FIG. 5, "successful" or "failed" on the right side of each sample face feature is used to represent a result of the comparison of similarity degrees between the corresponding sample face feature and each reference face feature. In FIG. 4, the comparisons of similarity degrees between the sample face features A2, A3, A4 and each reference face feature are all successful, and the comparisons of similarity degrees between sample face features B2, B3, B4 and each reference face feature are all successful as well. Therefore, it can be determined that the sample user A and the sample user B can be added to the same similar user group. In FIG. 5, because the comparison of similarity degrees between the sample face feature A4 and each reference face feature is failed, the sample user A and the sample user B may not be added to the same similar user group.

After the similar user group is created according to the above method, user authentication can be performed according to the method described in steps S102 to S104, as described in detail below.

First, before step S102 is performed, an authentication request of the user to be authenticated is received. The authentication request may include identifier information of the user to be authenticated. The identifier information includes at least one of an ID number, a communication number, a name, and predetermined identifier information. The predetermined identifier information may be information pre-stored on a server side by the user to be authenticated and used for identifying the identity of the user, e.g., a specified numeric string, or a specified text.

After the authentication request is received, step S102 is performed. It is judged whether the user to be authenticated belongs to the similar user group according to the identifier information of the user to be authenticated. The similar user group includes at least two similar users, and the similar users are users whose reference feature information meets a preset similarity condition and a preset distinguishability condition.

In an embodiment, the preset similarity condition may include: a similarity degree of the reference feature information reaches a preset threshold. The preset distinguishability condition may include: based on comparisons of similarity degrees between the sample feature information of a similar user and each piece of reference feature information in the similar user group to which the similar user belongs, a ratio of the number of successful similarity degree comparisons is greater than a preset ratio value. Detailed description has been given for the similar user group in the above embodiments, which will not be repeated in detail here.

After it is judged whether the user to be authenticated belongs to the similar user group, step S104 is performed, that is, if the user to be authenticated belongs to the similar user group, the user to be authenticated is authenticated according to reference feature information in the similar user group. Specific authentication may include the following steps.

In step 1, feature information collected for the user to be authenticated is acquired. A collection time of the feature information of the user to be authenticated is not limited in this embodiment. For example, the feature information of the user to be authenticated may be collected after the authentication request of the user to be authenticated is received, or the feature information of the user to be authenticated may be collected after it is judged whether the user to be authenticated belongs to the similar user group, or the feature information of the user to be authenticated may be collected before the user to be authenticated is authenticated according to the reference feature information in the similar user group when it is judged that the user to be authenticated belongs to the similar user group.

In step 2, the collected feature information is compared with each piece of reference feature information in the similar user group to obtain a comparison result.

In an embodiment, step 2 may be implemented in the following manner: first, calculating a first similarity degree between the collected feature information and reference feature information corresponding to a first similar user in the similar user group, and calculating a second similarity degree between the collected feature information and reference feature information corresponding to a second similar user in the similar user group, wherein the first similar user is a similar user whose identifier information is the same as that of the user to be authenticated, and the second similar user is a similar user whose identifier information is different from that of the user to be authenticated; then, judging whether the first similarity degree is greater than the second similarity degree; if yes, determining that the collected feature information matches the reference feature information corresponding to the first similar user; otherwise, determining that the collected feature information matches the reference feature information corresponding to the second similar user.

In step 3, it is determined whether the user to be authenticated passes the authentication according to the comparison result. For example, when the comparison result is that the collected feature information matches the reference feature information corresponding to the first similar user, that is, the first similarity degree is greater than the second similarity degree, it is determined that the user to be authenticated passes the authentication; when the comparison result is that the collected feature information matches the reference feature information corresponding to the second similar user, that is, the first similarity degree is not greater than the second similarity degree, it is determined that the user to be authenticated does not pass the authentication.

The case where the feature information is a face feature and security authentication is carried out for the user to be authenticated is taken as an example. It is assumed that a collected face feature of the user to be authenticated is A, identifier information is "XXX0", and the users to be authenticated belongs to a similar user group including similar users M and N. In the similar user group, the similar user M corresponds to identifier information "XXX0" and a reference face feature B1; the similar user N corresponds to identifier information "XXX1" and a reference face feature B2. In this case, during authentication for the user to be authenticated, a first similarity degree between the face feature A and the reference face feature B1 corresponding to a first similar user (that is, the similar user M whose identifier information is the same as that of the user to be authenticated) in the similar user group, and a second similarity degree between the face feature A and the reference face feature B2 corresponding to a second similar user (that is, the similar user N whose identifier information is different from that of the user to be authenticated) in the similar user group are calculated first. Secondly, it is judged whether the first similarity degree is greater than the second similarity degree. In one embodiment, the first similarity degree is 98%, and the second similarity degree is 90%. Because the first similarity degree is greater than the second similarity degree, it can be determined that the face feature A of the user to be authenticated matches the reference face feature B1 corresponding to the similar user M. In this case, the user to be authenticated passes the security authentication. In another embodiment, the first similarity degree is 90%, and the second similarity degree is 98%. Because the second similarity degree is greater than the first similarity degree, it can be determined that the face feature A of the user to be authenticated matches the reference face feature B2 corresponding to the similar user N. In this case, the user to be authenticated does not pass the security authentication.

Figure 6:
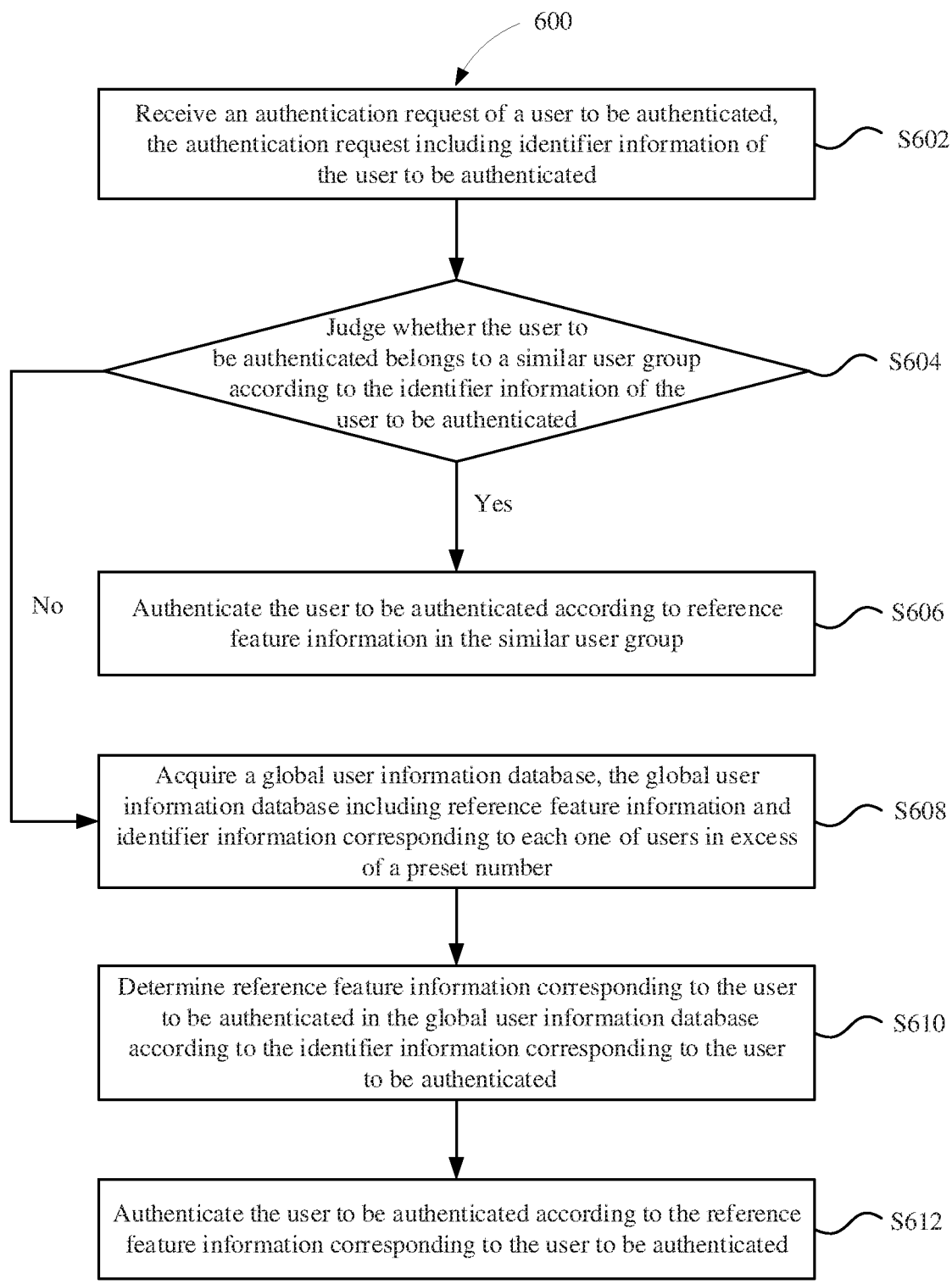
FIG. 6 is a flowchart of a method for user authentication based on feature information according to another embodiment.

FIG. 6 is a flow chart of a method 600 for user authentication, according to an embodiment. Referring to FIG. 6, the method 600 can include steps S602 to S612.

In step S602, an authentication request of a user to be authenticated is received, the authentication request including identifier information of the user to be authenticated.

In step S604, it is judged whether the user to be authenticated belongs to a similar user group according to the identifier information of the user to be authenticated; if yes, step S606 is performed; otherwise, step S608 is performed.

In step S606, the user to be authenticated is authenticated according to reference feature information in the similar user group.

In step S608, a global user information database is acquired, the global user information database including reference feature information and identifier information corresponding to each one of users in excess of a preset number.

In step S610, reference feature information corresponding to the user to be authenticated is determined in the global user information database according to the identifier information corresponding to the user to be authenticated.

In step S612, the user to be authenticated is authenticated according to the reference feature information corresponding to the user to be authenticated.

In this embodiment, if the user to be authenticated belongs to the similar user group, the user to be authenticated is authenticated according to the reference feature information in the similar user group; and if the user to be authenticated does not belong to the similar user group, the user to be authenticated is authenticated according to the reference feature information in the global user information database. It can be seen that the method 600 not only can authenticate ordinary users, but also can accurately authenticate similar users who may not be recognized easily, thus preventing misrecognition between multiple similar users (for example, faces of father and son, identical twins, and so on), and further improving an accuracy rate and a coverage rate of the user authentication.

In some embodiments, the above described operations can be performed in different sequences and can still achieve the expected result. In addition, the processes depicted in the drawings do not necessarily require the shown particular sequence or a continuous sequence to achieve the expected result. In some embodiments, multi-task processing and concurrent processing may be beneficial.

Embodiments of this specification further provide an apparatus for user authentication based on feature information, corresponding to the above described method.

Figure 7:
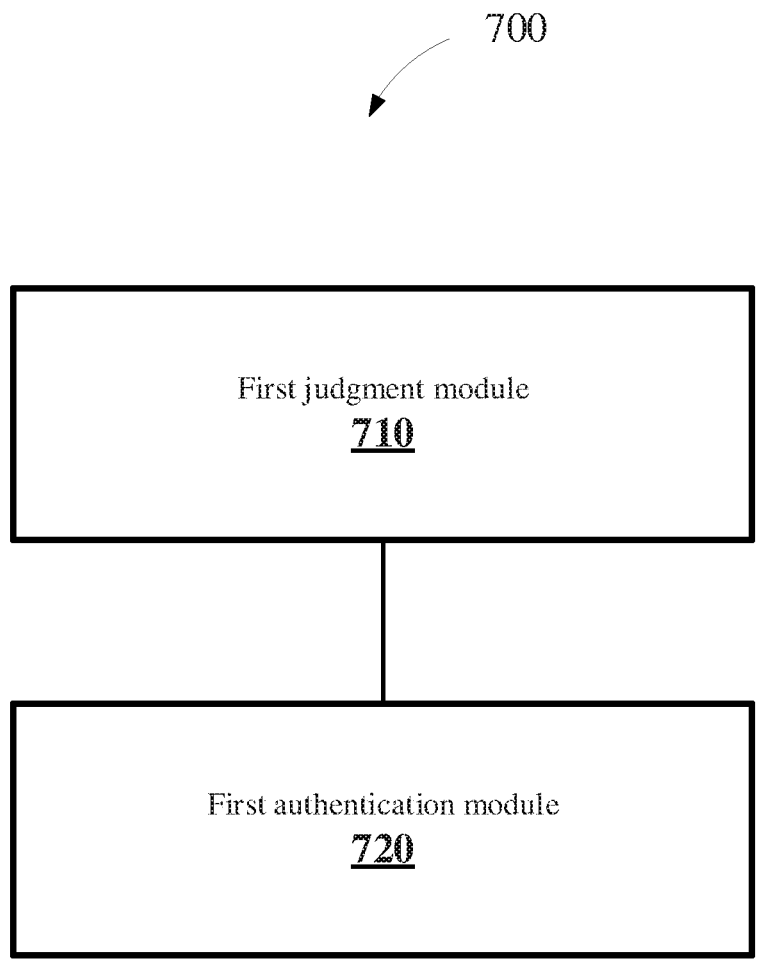
FIG. 7 is a block diagram of an apparatus for user authentication based on feature information according to an embodiment.

FIG. 7 is a block diagram of an apparatus 700 for user authentication based on feature information according to an embodiment. As shown in FIG. 7, the apparatus 700 includes: a first judgment module 710 configured to judge whether a user to be authenticated belongs to a similar user group, wherein the similar user group includes at least two similar users, and the similar users are users whose reference feature information meets a preset similarity condition and a preset distinguishability condition; and a first authentication module 720 configured to authenticate the user to be authenticated according to reference feature information in the similar user group if the user to be authenticated belongs to the similar user group.

In an embodiment, the first authentication module 720 includes: a first acquisition unit configured to acquire feature information collected for the user to be authenticated; a comparison unit configured to compare the collected feature information with each piece of reference feature information in the similar user group to obtain a first comparison result; and a determining unit configured to determine whether the user to be authenticated passes the authentication according to the first comparison result.

In an embodiment, the first judgment module 710 includes: an identifier information acquisition unit configured to acquire identifier information of the user to be authenticated; and a first judgment unit configured to judge whether the identifier information of the user to be authenticated matches identifier information of a similar user in a pre-stored similar user group; if yes, determine that the user to be authenticated belongs to the similar user group; otherwise, determine that the user to be authenticated does not belong to the similar user group.

In an embodiment, the preset similarity condition includes: a similarity degree of the reference feature information reaches a preset threshold.

In an embodiment, the preset distinguishability condition includes: based on comparisons of similarity degrees between the sample feature information of a similar user and each piece of reference feature information in the similar user group to which the similar user belongs, a ratio of the number of successful similarity degree comparisons is greater than a preset ratio value.

In an embodiment, the comparison unit is configured to calculate a first similarity degree between the collected feature information and reference feature information corresponding to a first similar user in the similar user group, and calculate a second similarity degree between the collected feature information and reference feature information corresponding to a second similar user in the similar user group, wherein the first similar user is a similar user whose identifier information is the same as that of the user to be authenticated, and the second similar user is a similar user whose identifier information is different from that of the user to be authenticated.

Correspondingly, the determining unit is configured to determine that the user to be authenticated passes the authentication if the first similarity degree is greater than the second similarity degree; and determine that the user to be authenticated does not pass the authentication if the first similarity degree is not greater than the second similarity degree.

In an embodiment, the comparison unit is configured to determine that the user to be authenticated passes the authentication when the first comparison result is that the collected feature information matches the reference feature information corresponding to the first similar user; and determine that the user to be authenticated does not pass the authentication when the first comparison result is that the collected feature information matches the reference feature information corresponding to the second similar user.

In an embodiment, the apparatus further 700 includes a creation module configured to create the similar user group.

The creation module includes: a second acquisition unit configured to acquire reference feature information and sample feature information corresponding to each one of at least two sample users, wherein the reference feature information of the at least two sample users meets the preset similarity condition; a calculation unit configured to calculate, for any of the sample users, similarity degrees between the sample feature information corresponding to the sample user and the reference feature information corresponding to each sample user; a second judgment unit configured to judge whether the at least two sample users meet the preset distinguishability condition according to the calculated similarity degrees; and an adding unit configured to add the at least two sample users to the same similar user group when the at least two sample users meet the preset distinguishability condition.

In an embodiment, the second judgment unit is configured to compare a third similarity degree between the sample feature information corresponding to any one of the at least two sample users and the reference feature information corresponding to the sample user with a fourth similarity degree between the sample feature information corresponding to the sample user and the reference feature information corresponding to the other sample users of the at least two sample users, to obtain a second comparison result; judge whether the third similarity degree is greater than the fourth similarity degree according to the second comparison result; if yes, determine that a comparison of similarity degrees between the sample feature information corresponding to the sample user and the reference feature information corresponding to each sample user is successful; otherwise, determine that the comparison of similarity degrees between the sample feature information corresponding to the sample user and the reference feature information corresponding to each sample user is failed; and collect statistics on a ratio of the number of successful similarity degree comparisons, and determine that the at least two sample users meet the preset distinguishability condition when the ratio of the number is greater than the preset ratio value.

Figure 8:
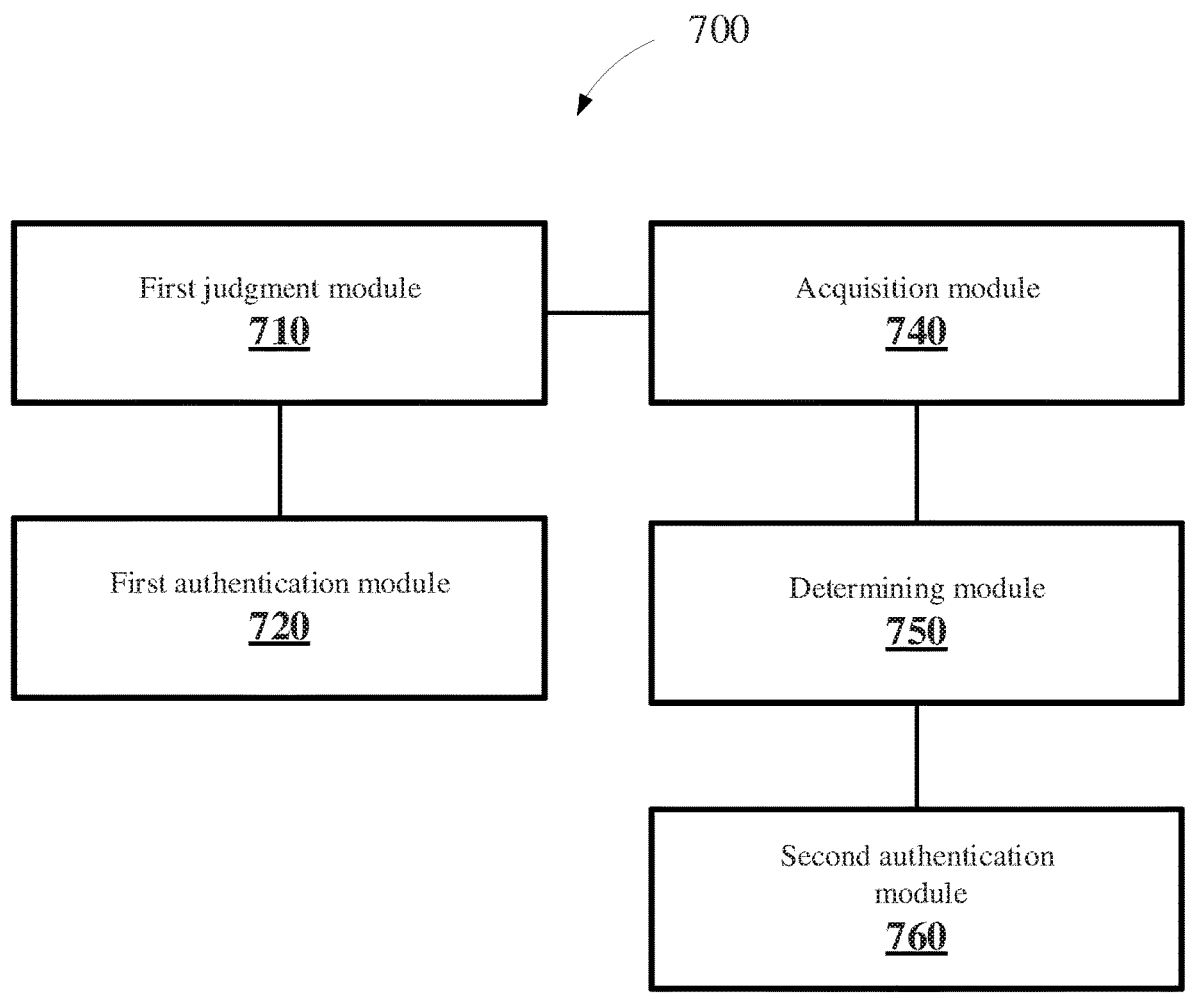
FIG. 8 is a block diagram of an apparatus for user authentication based on feature information according to another embodiment.

In an embodiment, shown in FIG. 8, the apparatus 700 further includes: an acquisition module 740 configured to acquire a global user information database when the user to be authenticated does not belong to the similar user group, the global user information database including reference feature information and identifier information corresponding to each one of users in excess of a preset number; a determining module 750 configured to determine reference feature information corresponding to the user to be authenticated in the global user information database according to identifier information corresponding to the user to be authenticated; and a second authentication module 760 configured to authenticate the user to be authenticated according to the reference feature information corresponding to the user to be authenticated.

In an embodiment, the feature information includes at least one piece of the following information: a face feature, an iris feature, a fingerprint, and an eyeprint. The identifier information includes at least one of an ID number, a communication number, a name, and predetermined identifier information.

Embodiments of this specification further provide an apparatus for user authentication based on feature information, including: a receiving module configured to receive an authentication request of a user to be authenticated, the authentication request including identifier information of the user to be authenticated; a second judgment module configured to judge whether the user to be authenticated belongs to a similar user group according to the identifier information of the user to be authenticated, wherein the similar user group includes at least two similar users, and the similar users are users whose reference feature information meets a preset similarity condition and a preset distinguishability condition; a calculation module configured to, if the user to be authenticated belongs to the similar user group, acquire feature information collected for the user to be authenticated, calculate a first similarity degree between the collected feature information and reference feature information corresponding to a first similar user in the similar user group, and calculate a second similarity degree between the collected feature information and reference feature information corresponding to a second similar user the similar user group, wherein the first similar user is a similar user whose identifier information is the same as that of the user to be authenticated, and the second similar user is a similar user whose identifier information is different from that of the user to be authenticated; and a determining module configured to determine that the user to be authenticated passes the authentication if the first similarity degree is greater than the second similarity degree.

By using the apparatus 700, it is first judged whether a user to be authenticated belongs to a similar user group, and if the user to be authenticated belongs to the similar user group, the user to be authenticated is authenticated according to reference feature information in the similar user group, wherein the similar user group includes at least two similar users, and the at least two similar users are users whose reference feature information meets a preset similarity condition and a preset distinguishability condition. The apparatus 700 can implement authentication for the user to be authenticated by using the similar user group to which similar users meeting the preset similarity condition and the preset distinguishability condition belong. Therefore, the user to be authenticated can be distinguished from a similar user thereof, thus preventing misrecognition between multiple similar users (for example, faces of father and son, identical twins, and so on), and further improving an accuracy rate of the user authentication. In addition, compared with the existing art in which authentication for similar users is shielded, the apparatus 700 may greatly improve a coverage rate of the user authentication.

Figure 9:
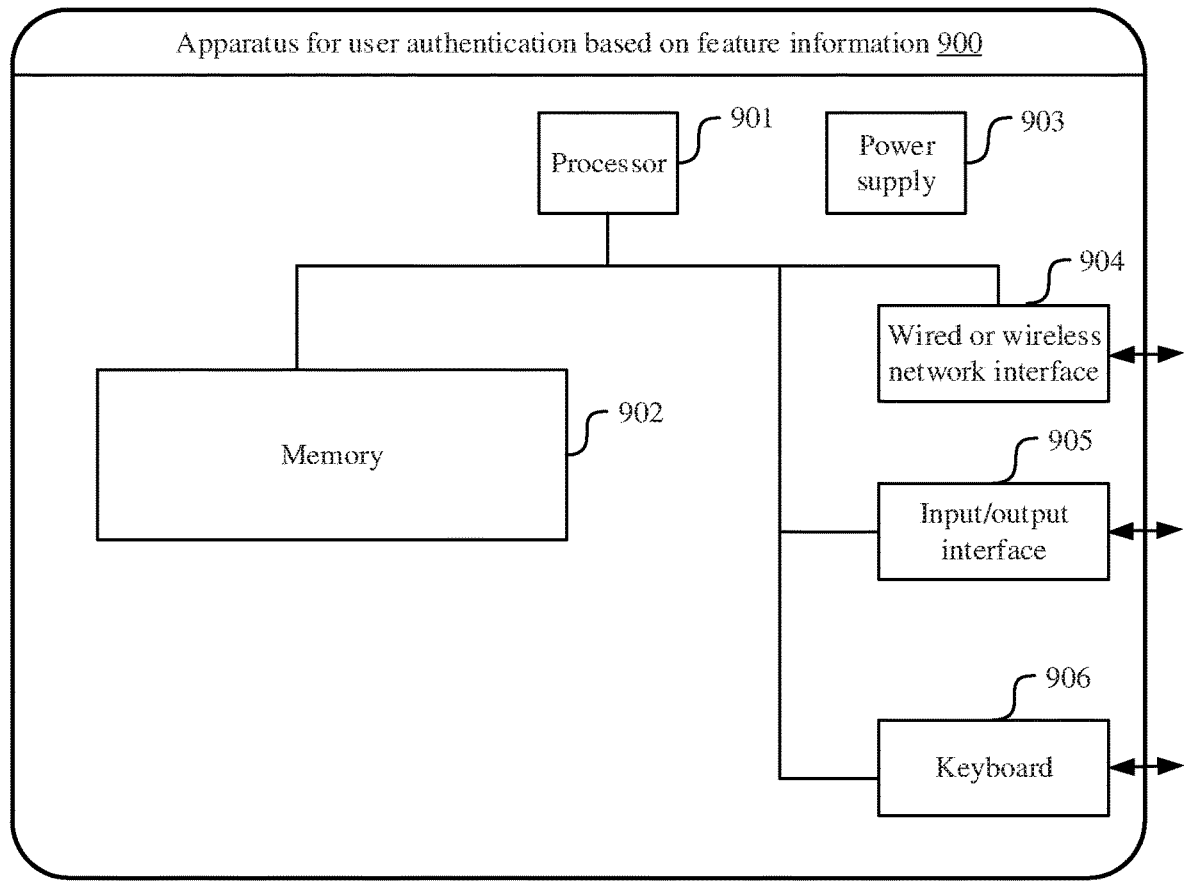
FIG. 9 is a block diagram of an apparatus for user authentication based on feature information according to another embodiment.

Embodiments of this specification further provide an apparatus 900 for user authentication based on feature information, as shown in FIG. 9. The apparatus 900 for user authentication based on feature information may vary significantly due to different configurations or performance, and may include one or more processors 901 and a memory 902.

The one or more processors 901 may include one or more dedicated processing units, application-specific integrated circuits (ASICs), field-programmable gate arrays (FPGAs), or various other types of processors or processing units. The one or more processors 901 are coupled with the memory 902 and is configured to execute instructions stored in the memory 902 to perform the above described methods.

The memory 902 may include a non-permanent memory, a random access memory (RAM) and/or a non-volatile memory (such as a read-only memory (ROM) or a flash memory (flash RAM)), etc.

One or more application programs or data may be stored in the memory 902. The memory 902 may support transient storage or persistent storage. The application program stored in the memory 902 may include one or more modules not shown), and each module may include a series of computer executable instructions in the apparatus 900 for user authentication based on feature information. Furthermore, the processor 901 may be configured to communicate with the memory 902, and execute a series of computer executable instructions in the memory 902 on the apparatus 900 for user authentication based on feature information. The apparatus 900 for user authentication based on feature information may further include one or more power supplies 903, one or more wired or wireless network interfaces 904, one or more input/output interfaces 905, and one or more keyboards 906.

In an embodiment, computer executable instructions are stored in the memory 902 and the processor 901 may execute the computer executable instructions to perform: judging whether a user to be authenticated belongs to a similar user group, wherein the similar user group includes at least two similar users, and the similar users are users whose reference feature information meets a preset similarity condition and a preset distinguishability condition; and authenticating the user to be authenticated according to reference feature information in the similar user group if the user to be authenticated belongs to the similar user group.

In an embodiment, when the computer executable instructions are executed, the processor 901 may further perform the following operations, to authenticate the user to be authenticated according to reference feature information in the similar user group includes: acquiring feature information collected for the user to be authenticated; comparing the collected feature information with each piece of reference feature information in the similar user group to obtain a first comparison result; and determining whether the user to be authenticated passes the authentication according to the first comparison result.

In an embodiment, when the computer executable instructions are executed, the processor 901 may further perform the following operations: acquiring identifier information of the user to be authenticated; and judging whether the identifier information of the user to be authenticated matches identifier information of a similar user in a pre-stored similar user group; if yes, determining that the user to be authenticated belongs to the similar user group; otherwise, determining that the user to be authenticated does not belong to the similar user group.

In an embodiment, the preset similarity condition includes: a similarity degree of the reference feature information reaches a preset threshold.

In an embodiment, the preset distinguishability condition includes: based on comparisons of similarity degrees between the sample feature information of the similar user and each piece of reference feature information in the similar user group to which the similar user belongs, a ratio of the number of successful similarity degree comparisons is greater than a preset ratio value.

In an embodiment, when the computer executable instructions are executed, the processor 901 may further perform the following operations: calculating a first similarity degree between the collected feature information and reference feature information corresponding to a first similar user in the similar user group, and calculating a second similarity degree between the collected feature information and reference feature information corresponding to a second similar user in the similar user group, wherein the first similar user is a similar user whose identifier information is the same as that of the user to be authenticated, and the second similar user is a similar user whose identifier information is different from that of the user to be authenticated.

Correspondingly, determining that the user to be authenticated passes the authentication if the first similarity degree is greater than the second similarity degree; and determining that the user to be authenticated does not pass the authentication if the first similarity degree is not greater than the second similarity degree.

In an embodiment, when the computer executable instructions are executed, the processor 901 may further perform the following operations: acquiring reference feature information and sample feature information corresponding to each one of at least two sample users, wherein the reference feature information of the at least two sample users meets the preset similarity condition; calculating, for any of the sample users, similarity degrees between the sample feature information corresponding to the sample user and the reference feature information corresponding to each sample user; judging whether the at least two sample users meet the preset distinguishability condition according to the calculated similarity degrees; and adding the at least two sample users to the same similar user group when the at least two sample users meet the preset distinguishability condition.

In an embodiment, when the computer executable instructions are executed, the processor 901 may further perform the following operations: comparing a third similarity degree between the sample feature information corresponding to any one of the at least two sample users and the reference feature information corresponding to the sample user with a fourth similarity degree between the sample feature information corresponding to the sample user and the reference feature information corresponding to the other sample users in the at least two sample users, to obtain a second comparison result; judging whether the third similarity degree is greater than the fourth similarity degree according to the second comparison result; if yes, determining that a comparison of similarity degrees between the sample feature information corresponding to the sample user and the reference feature information corresponding to each sample user is successful; otherwise, determining that the comparison of similarity degrees between the sample feature information corresponding to the sample user and the reference feature information corresponding to each sample user is failed; and collecting statistics on a ratio of the number of successful similarity degree comparisons, and determining that the at least two sample users meet the preset distinguishability condition when the ratio of the number is greater than the preset ratio value.

In an embodiment, when the computer executable instructions are executed, the processor 901 may further perform the following operations: acquiring a global user information database when the user to be authenticated does not belong to the similar user group, the global user information database including reference feature information and identifier information corresponding to each one of users in excess of a preset number; determining reference feature information corresponding to the user to be authenticated in the global user information database according to identifier information corresponding to the user to be authenticated; and authenticating the user to be authenticated according to the reference feature information corresponding to the user to be authenticated.

In an embodiment, the feature information includes at least one piece of the following information: a face feature, an iris feature, a fingerprint, and an eyeprint, and the identifier information includes at least one of an ID number, a communication number, a name, and predetermined identifier information.

The apparatus 900 for user authentication based on feature information may further be configured such that the processor 901 executes the computer executable instructions to perform: receiving an authentication request of a user to be authenticated, the authentication request including identifier information of the user to be authenticated; judging whether the user to be authenticated belongs to a similar user group according to the identifier information of the user to be authenticated, wherein the similar user group includes at least two similar users, and the similar users are users whose reference feature information meets a preset similarity condition and a preset distinguishability condition; if the user to be authenticated belongs to the similar user group, acquiring feature information collected for the user to be authenticated, calculating a first similarity degree between the collected feature information and reference feature information corresponding to a first similar user in the similar user group, and calculating a second similarity degree between the collected feature information and reference feature information corresponding to a second similar user in the similar user group, wherein the first similar user is a similar user whose identifier information is the same as that of the user to be authenticated, and the second similar user is a similar user whose identifier information is different from that of the user to be authenticated; and determining that the user to be authenticated passes the authentication if the first similarity degree is greater than the second similarity degree.

Embodiments of this specification further provide a computer-readable storage medium. The computer-readable storage medium stores one or more programs that include instructions. When executed by a processor of an electronic device, the instructions can cause the electronic device to perform a method for user authentication based on feature information, including: judging whether a user to be authenticated belongs to a similar user group, wherein the similar user group includes at least two similar users, and the similar users are users whose reference feature information meets a preset similarity condition and a preset distinguishability condition; and authenticating the user to be authenticated according to reference feature information in the similar user group if the user to be authenticated belongs to the similar user group.

Embodiments of this specification further provide a computer-readable storage medium. The computer-readable storage medium stores one or more programs that include instructions. When executed by a processor of an electronic device, the instructions can cause the electronic device to perform a method for user authentication based on feature information, including: receiving an authentication request of a user to be authenticated, the authentication request including identifier information of the user to be authenticated; judging whether the user to be authenticated belongs to a similar user group according to the identifier information of the user to be authenticated, wherein the similar user group includes at least two similar users, and the similar users are users whose reference feature information meets a preset similarity condition and a preset distinguishability condition; if the user to be authenticated belongs to the similar user group, acquiring feature information collected for the user to be authenticated, calculating a first similarity degree between the collected feature information and reference feature information corresponding to a first similar user in the similar user group, and calculating a second similarity degree between the collected feature information and reference feature information corresponding to a second similar user in the similar user group, wherein the first similar user is a similar user whose identifier information is the same as that of the user to be authenticated, and the second similar user is a similar user whose identifier information is different from that of the user to be authenticated; and determining that the user to be authenticated passes the authentication if the first similarity degree is greater than the second similarity degree.

The system, apparatus, modules or units illustrated in the foregoing embodiments can be implemented by a computer chip or an entity, or implemented by a product having a specific function. A typical implementation device is a computer. For example, the computer can be a personal computer, a laptop computer, a cellular phone, a camera phone, a smart phone, a personal digital assistant, a media player, a navigation device, an email device, a game console, a tablet computer, a wearable device, or a combination of any of these devices.

Each of the above described modules and units may be implemented as software, or hardware, or a combination of software and hardware. For example, each of the above described modules and units may be implemented using a processor executing instructions stored in a memory. Also, for example, each of the above described modules and units may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

Those skilled in the art should understand that one or more embodiments of this specification can be provided as a method, a system, or a computer program product. Therefore, one or more embodiments of this specification may be implemented as a complete hardware embodiment, a complete software embodiment, or an embodiment combining software and hardware. Moreover, one or more embodiments of this specification can be in the form of a computer program product implemented on one or more computer usable storage media (including, but not limited to, a magnetic disk memory, a compact disk read-only memory (CD-ROM), an optical memory and the like) including computer usable program codes.

Embodiments of this specification are described with reference to flowcharts and/or block diagrams of the method, device (system) and computer program product. It should be understood that computer program instructions can be used to implement each process and/or block in the flowcharts and/or block diagrams and combinations of processes and/or blocks in the flowcharts and/or block diagrams. These computer program instructions can be provided to a general-purpose computer, a special-purpose computer, an embedded processor, or a processor of another programmable data processing device to generate a machine, such that the instructions executed by a computer or a processor of another programmable data processing device generate an apparatus for implementing functions specified in one or more processes in the flowcharts and/or in one or more blocks in the block diagrams.

The computer program instructions may also be stored in a computer-readable memory that can guide the computer or another programmable data processing device to work in a specific manner, such that the instructions stored in the computer-readable memory generate an article of manufacture including an instruction apparatus, and the instruction apparatus implements functions specified in one or more processes in the flowcharts and/or one or more blocks in the block diagrams.

These computer program instructions can also be loaded onto a computer or another programmable data processing device, such that a series of operation steps are performed on the computer another programmable device to generate computer-implemented processing. Therefore, the instructions executed on the computer or another programmable device provide steps for implementing functions specified in one or more processes in the flowcharts and/or one or more blocks in the block diagrams.

The computer-readable storage medium includes non-volatile and volatile media as well as movable and non-movable media, and can implement information storage by means of any method or technology information may be a computer-readable instruction, a data structure, and a module of a program or other data. Examples of the computer-readable storage medium include, but are not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a CD-ROM, a digital versatile disc (DVD) or other optical storages, a cassette tape, a magnetic tape/magnetic disk storage or other magnetic storage devices, or any other non-transmission media, and can be used to store information accessible to the computing device. According to the definition in this text, the computer readable medium does not include transitory media, such as modulated data signals and carriers.

It should be further noted that, the terms "include", "comprise" or any other variations thereof are intended to cover a non-exclusive inclusion, so that a process, method, article, or device including a series of elements not only includes the elements, but also includes other elements not expressly listed, or further includes elements inherent to the process, method, article, or device. In the absence of more limitations, an element defined by "including a/an . . . " does not exclude that the process, method, article or device including the element further has other identical elements.

One or more embodiments of this specification can be described in a general context of a computer executable instruction executed by a computer, for example, a program module. Generally, the program module includes a routine, a program, an object, an assembly, a data structure, and the like for executing a specific task or implementing a specific abstract data type. One or more embodiments of this specification can also be implemented in distributed computing environments. In the distributed computing environments, a task is executed by using remote processing devices connected through a communications network. In the distributed computing environments, the program module may be located in local and remote computer storage media including a storage device.

Although the specification has been described in conjunction with specific embodiments, many alternatives, modifications and variations will be apparent to those skilled in the art. Accordingly, the following claims embrace all such alternatives, modifications and variations that fall within the terms of the claims.

The invention claimed is:

1. A method for user authentication based on feature information, comprising:

judging whether a user to be authenticated belongs to a similar user group, wherein the similar user group comprises at least two similar users, and the similar users are users whose reference feature information meets a preset similarity condition and a preset distinguishability condition; and authenticating the user to be authenticated according to reference feature information in the similar user group when the user to be authenticated belongs to the similar user group, wherein the method further comprises:

acquiring reference feature information and sample feature information corresponding to each one of at least two sample users, wherein the reference feature information of the at least two sample users meets the preset similarity condition;

calculating, for any of the at least two sample users, similarity degrees between the sample feature information corresponding to the sample user and the reference feature information corresponding to each sample user of the at least two sample users;

judging whether the at least two sample users meet the preset distinguishability condition according to the calculated similarity degrees; and adding the at least two sample users to the same similar user group when the at least two sample users meet the preset distinguishability condition.

2. The method according to claim 1, wherein the authenticating the user to be authenticated according to reference feature information in the similar user group comprises:

acquiring feature information collected for the user to be authenticated;

comparing the collected feature information with each piece of reference feature information in the similar user group to obtain a first comparison result; and determining whether the user to be authenticated passes the authentication according to the first comparison result.

3. The method according to claim 2, wherein the comparing the collected feature information with each piece of reference feature information in the similar user group to obtain a first comparison result comprises:

calculating a first similarity degree between the collected feature information and reference feature information corresponding to a first similar user in the similar user group, and calculating a second similarity degree between the collected feature information and reference feature information corresponding to a second similar user in the similar user group, wherein the first similar user is a similar user having the same identifier information as that of the user to be authenticated, and the second similar user is a similar user whose identifier information is different from that of the user to be authenticated, and wherein the determining whether the user to be authenticated passes the authentication according to the first comparison result comprises:

determining that the user to be authenticated passes the authentication if the first similarity degree is greater than the second similarity degree; and determining that the user to be authenticated does not pass the authentication if the first similarity degree is not greater than the second similarity degree.

4. The method according to claim 1, wherein the judging whether a user to be authenticated belongs to a similar user group comprises:

acquiring identifier information of the user to be authenticated; and judging whether the identifier information of the user to be authenticated matches identifier information of a similar user in the similar user group that is pre-stored; if yes, determining that the user to be authenticated belongs to the similar user group; otherwise, determining that the user to be authenticated does not belong to the similar user group.

5. The method according to claim 4, wherein the feature information comprises at least one piece of the following information: a face feature, an iris feature, a fingerprint, or an eyeprint, and the identifier information comprises at least one of an ID number, a communication number, a name, or predetermined identifier information.

6. The method according to claim 1, wherein the preset similarity condition comprises: a similarity degree of the reference feature information reaches a preset threshold.

7. The method according to claim 1, wherein the preset distinguishability condition comprises: based on comparisons of similarity degrees between the sample feature information of a similar user and each piece of reference feature information in the similar user group to which the similar user belongs, a ratio of a number of successful similarity degree comparisons is greater than a preset ratio value.

8. The method according to claim 1, wherein the judging whether the at least two sample users meet the preset distinguishability condition according to the calculated similarity degrees comprises:

comparing a third similarity degree between the sample feature information corresponding to any one of the at least two sample users and the reference feature information corresponding to the sample user with a fourth similarity degree between the sample feature information corresponding to the sample user and the reference feature information corresponding to other sample users of the at least two sample users, to obtain a second comparison result;

judging whether the third similarity degree is greater than the fourth similarity degree according to the second comparison result;

if yes, determining that a comparison of similarity degrees between the sample feature information corresponding to the sample user and the reference feature information corresponding to each sample user is successful; otherwise, determining that the comparison of similarity degrees between the sample feature information corresponding to the sample user and the reference feature information corresponding to each sample user is failed; and collecting statistics on a ratio of a number of successful similarity degree comparisons, and determining that the at least two sample users meet the preset distinguishability condition when the ratio of the number is greater than a preset ratio value.

9. The method according to claim 1, further comprising:

acquiring a global user information database when the user to be authenticated does not belong to the similar user group, the global user information database comprising reference feature information and identifier information corresponding to each one of users in excess of a preset number;

determining reference feature information corresponding to the user to be authenticated in the global user information database according to identifier information corresponding to the user to be authenticated; and authenticating the user to be authenticated according to the reference feature information corresponding to the user to be authenticated.

10. The method according to claim 1, further comprising:

receiving an authentication request of the user to be authenticated, the authentication request comprising identifier information of the user to be authenticated;

when the user to be authenticated belongs to the similar user group, acquiring feature information collected for the user to be authenticated, calculating a first similarity degree between the collected feature information and reference feature information corresponding to a first similar user in the similar user group, and calculating a second similarity degree between the collected feature information and reference feature information corresponding to a second similar user in the similar user group, wherein the first similar user is a similar user having the same identifier information as that of the user to be authenticated, and the second similar user is a similar user whose identifier information is different from that of the user to be authenticated; and determining that the user to be authenticated passes the authentication if the first similarity degree is greater than the second similarity degree.

11. An apparatus for user authentication based on feature information, comprising:

a processor; and a memory configured to store computer executable instructions, wherein when executing the computer executable instructions, the processor performs:

judging whether a user to be authenticated belongs to a similar user group, wherein the similar user group comprises at least two similar users, and the similar users are users whose reference feature information meets a preset similarity condition and a preset distinguishability condition; and authenticating the user to be authenticated according to reference feature information in the similar user group if the user to be authenticated belongs to the similar user group, wherein the processor further performs:

acquiring reference feature information and sample feature information corresponding to each one of at least two sample users, wherein the reference feature information of the at least two sample users meets the preset similarity condition;

calculating, for any of the at least two sample users, similarity degrees between the sample feature information corresponding to the sample user and the reference feature information corresponding to each sample user of the at least two sample users;

judging whether the at least two sample users meet the preset distinguishability condition according to the calculated similarity degrees; and adding the at least two sample users to the same similar user group when the at least two sample users meet the preset distinguishability condition.

12. The apparatus according to claim 11, wherein when executing the computer executable instructions, the processor further perform:

acquiring feature information collected for the user to be authenticated;

comparing the collected feature information with each piece of reference feature information in the similar user group to obtain a first comparison result; and determining whether the user to be authenticated passes the authentication according to the first comparison result.

13. The apparatus according to claim 12, wherein when executing the computer executable instructions, the processor further performs:

calculating a first similarity degree between the collected feature information and reference feature information corresponding to a first similar user in the similar user group, and calculating a second similarity degree between the collected feature information and reference feature information corresponding to a second similar user in the similar user group, wherein the first similar user is a similar user having the same identifier information as that of the user to be authenticated, and the second similar user is a similar user whose identifier information is different from that of the user to be authenticated;

determining that the user to be authenticated passes the authentication if the first similarity degree is greater than the second similarity degree; and determining that the user to be authenticated does not pass the authentication if the first similarity degree is not greater than the second similarity degree.

14. The apparatus according to claim 11, wherein when executing the computer executable instructions, the processor further performs:

acquiring identifier information of the user to be authenticated; and judging whether the identifier information of the user to be authenticated matches identifier information of a similar user in the similar user group that is pre-stored; if yes, determining that the user to be authenticated belongs to the similar user group; otherwise, determining that the user to be authenticated does not belong to the similar user group.

15. The apparatus according to claim 11, wherein when executing the computer executable instructions, the processor further performs:

receiving an authentication request of the user to be authenticated, the authentication request comprising identifier information of the user to be authenticated;

when the user to be authenticated belongs to the similar user group, acquiring feature information collected for the user to be authenticated, calculating a first similarity degree between the collected feature information and reference feature information corresponding to a first similar user in the similar user group, and calculating a second similarity degree between the collected feature information and reference feature information corresponding to a second similar user in the similar user group, wherein the first similar user is a similar user having the same identifier information as that of the user to be authenticated, and the second similar user is a similar user whose identifier information is different from that of the user to be authenticated; and determining that the user to be authenticated passes the authentication if the first similarity degree is greater than the second similarity degree.

16. A non-transitory storage medium storing computer executable instructions that, when executed by a processor of a device, cause the device to perform a method for user authentication based on feature information, the method comprising:

judging whether a user to be authenticated belongs to a similar user group, wherein the similar user group comprises at least two similar users, and the similar users are users whose reference feature information meets a preset similarity condition and a preset distinguishability condition; and authenticating the user to be authenticated according to reference feature information in the similar user group if the user to be authenticated belongs to the similar user group, wherein the method further comprises:

acquiring reference feature information and sample feature information corresponding to each one of at least two sample users, wherein the reference feature information of the at least two sample users meets the preset similarity condition;

calculating, for any of the at least two sample users, similarity degrees between the sample feature information corresponding to the sample user and the reference feature information corresponding to each sample user of the at least two sample users;

judging whether the at least two sample users meet the preset distinguishability condition according to the calculated similarity degrees; and adding the at least two sample users to the same similar user group when the at least two sample users meet the preset distinguishability condition.

17. The non-transitory storage medium according to claim 16, wherein the method further comprises:

receiving an authentication request of the user to be authenticated, the authentication request comprising identifier information of the user to be authenticated;

when the user to be authenticated belongs to the similar user group, acquiring feature information collected for the user to be authenticated, calculating a first similarity degree between the collected feature information and reference feature information corresponding to a first similar user in the similar user group, and calculating a second similarity degree between the collected feature information and reference feature information corresponding to a second similar user in the similar user group, wherein the first similar user is a similar user having the same identifier information as that of the user to be authenticated, and the second similar user is a similar user whose identifier information is different from that of the user to be authenticated; and determining that the user to be authenticated passes the authentication if the first similarity degree is greater than the second similarity degree.

\* \* \* \* \*